United States Patent [19]
Brandman et al.

[11] Patent Number: 5,479,498
[45] Date of Patent: Dec. 26, 1995

[54] DIGITAL LINE CARD HAVING UNIVERSAL PORT FOR UPGRADING ELECTRONIC MESSAGING SYSTEM

[75] Inventors: Yigal Brandman, Palo Alto; Frank C. H. Lin, Saratoga; Peter D. Olson, Los Gatos; Manoj Puri; Jason Subramaniam, both of Fremont, all of Calif.

[73] Assignee: Octel Communications Corporation, Milpitas, Calif.

[21] Appl. No.: 76,440

[22] Filed: Jun. 11, 1993

Related U.S. Application Data

[63] Continuation-in-part of Ser. No. 625,366, Dec. 11, 1990, Pat. No. 5,257,309.
[51] Int. Cl.$^6$ ............................................. H04M 1/50
[52] U.S. Cl. ............................ 379/283; 379/88; 379/97; 379/386; 379/399
[58] Field of Search ................................... 379/67, 88, 89, 379/97, 283, 386, 399

[56] References Cited

U.S. PATENT DOCUMENTS

| | | | |
|---|---|---|---|
| 4,652,700 | 3/1987 | Matthews et al. | 379/89 |
| 4,659,876 | 4/1987 | Sullivan et al. | 379/96 |
| 4,689,760 | 8/1987 | Lee et al. | 379/386 |
| 4,774,590 | 9/1988 | Haganume et al. | 358/280 |
| 4,893,333 | 1/1990 | Baran et al. | 379/100 |
| 4,908,850 | 3/1990 | Masson et al. | 379/88 |
| 4,914,704 | 4/1990 | Cole et al. | 381/43 |
| 4,916,726 | 4/1990 | Morley et al. | 379/88 |
| 4,918,722 | 4/1990 | Duehren et al. | 379/100 |
| 4,974,254 | 11/1990 | Perine et al. | 379/100 |
| 4,989,232 | 1/1991 | Tsumura | 379/88 |
| 4,994,926 | 2/1991 | Gordon et al. | 358/400 |
| 5,008,926 | 4/1991 | Misholi | 379/89 |
| 5,222,120 | 6/1993 | McLeod et al. | 379/89 |
| 5,274,696 | 12/1993 | Perelman | 379/89 |
| 5,349,636 | 9/1994 | Irribarren | 379/88 |

OTHER PUBLICATIONS

*FaxMemo* Product Literature, Centigram Communications Corporation, Apr. 1991.
*Integrated Voice/Fax Mail* Product Literature, Digital Sound Corporation, 1992.
*Fax Management, AudioFax Classes of Service, Series 100 and 300 Application Note*, AudioFAX, Inc., 1992.
"Brooktrout unveils 4-port voice/facsimile/data card", Network World, Jul. 27, 1992.
"The Universal Port", product brochure, Brooktrout Technology, circa Jun. 1992.
P. Mock, "Add DTMF Generation and Decoding to DSP-mP Designs", Electronic Design News, vol. 30, No. 6, pp. 205–213, Mar. 1985.
"Sleeper Product—A Combo Voice/Data I/O Card—Awakens Interest", Electronic Engineering Times, pp. 80–81, Nov. 11, 1985 (CMP Publications).
P. Ehlig, "DSP Chip Adds Multitaking Telecom Capability To Engineering Workstation", Electronic Design, vol. 33, No. 10, pp. 173–184, May 2, 1985.
J. D. Mills et al., "A Data And Voice System For The General Service Telephone Network", Proceedings of IECON '87, vol. 2, pp. 1143–1148, Nov. 1987.

*Primary Examiner*—Jeffery A. Hofsass
*Assistant Examiner*—Fan Tsang
*Attorney, Agent, or Firm*—Fish & Neave; Nicola A. Pisano

[57] ABSTRACT

A digital line card is provided for use in an electronic messaging system for enabling the receipt of voice and text or image data over a single communications port. The digital line card includes a digital signal processing integrated circuit, a microprocessor and a random access memory component for storing coding schemes employed by the digital signal processing integrated circuit. The digital line card is programmed to detect the presence of dual-tone multifrequency command signals in the incoming data stream, and to switch between voice and data processing responsive to the command signals.

20 Claims, 2 Drawing Sheets

DIGITAL LINE CARD HAVING UNIVERSAL PORT FOR UPGRADING ELECTRONIC MESSAGING SYSTEM

This application is a continuation-in-part of U.S. patent application Ser. No. 07/625,366, filed Dec. 11, 1990, and entitled Dual Tone Multifrequency Signal Detection And Identification Methods And Apparatus now U.S. Pat. No. 5,257,309, issued Oct. 26, 1993.

FIELD OF THE INVENTION

This invention relates to apparatus for receiving and transmitting voice messages and electronic representations of text or images, or both, over a single communications line. In particular, the present invention provides a universal port—a single channel voice and data communications integrated circuit board that can be readily installed in conventional telephone answering systems.

BACKGROUND OF THE INVENTION

Contemporary business has embraced two technologies that allow an individual employee to be more efficient and productive. The first of these technologies is voice messaging technology. In conventional voice messaging technology, a caller first calls an intended recipient by telephone. If the recipient of the call is absent, the caller is automatically connected to the recipient's voice messaging system. This system enables the caller to record a message for the recipient-subscriber in the caller's own voice, which message is then stored in an electronic format by the system. When subscriber calls into the system, he can play back the voice message on his telephone by issuing suitable commands.

The second technology effecting modern business practices is the facsimile machine or telecopier, which enables a sender to transmit a text or visual image (collectively "data") via electronic medium to a remote location, where the text or image may be printed out. Conventional facsimile technology requires telecopy equipment at both the sending and receiving stations, the first to encode the transmittal into electronic format and the latter to decode the transmittal back to a text or visual image suitable for printing.

Voice messaging and telecopy technologies have freed the employee from his office, and have enabled the businessman to conduct a large part of his work away from his home office. By calling in to his office from a remote location, the executive can listen to voice messages. Likewise, the facsimile machine has enabled the businessman to receive text or visual images virtually anywhere in the world accessible by public telephone lines.

An evolution of facsimile technology is the ongoing development of methods and apparatus for receiving and storing in electronic format the electronic representation of a facsimile transmittal. Such systems, known generically as "Fax Mail" systems, permit an incoming telecopy transmittal to be stored on a data storage system in electronic form, for later recall by the system subscriber. In this manner, the intended recipient may, for example, call into the office from a remote location, determine that a facsimile transmittal is available for him, and then direct that the text or image stored on the system be transmitted for printout to a facsimile machine at the remote location.

Previously known telephone answering systems have employed different integrated circuit components for receiving and transmitting voice information and text or image information. For example, in the Aspen(TM) telephone answering system sold by Octel Communications Corporation, Milpitas, Calif., voice signals received by the system are processed through an Analog Line Card ("ALC") which discretizes the signal into a digital electronic format using conventional voice processing techniques. Such analog processing circuitry is not suitable, however, for processing digital data, or for interpreting dual-tone modulated frequency (DTMF) signals (typically referred to as "Touchtones").

Voice system manufacturers have heretofore provided separate integrated circuit modules to enable their voice processing systems to receive or transmit text or image data. For example, Octel Communications Corporation provides the 500D Data Module, to enable their voice mail systems to receive and transmit facsimile messages. The 500D Data Module requires a dedicated communications port separate from those channels used for recording and transmitting voice messages, because a different protocol is used in processing data rather than voice signals.

A drawback common to previously known telephone answering systems with the ability to receive either voice signals or data was the inability to permit the caller, on a continuing basis, to vary the type of incoming signal. For example, in systems such as the 500D Data Module, once the incoming call was determined to be either voice or data, it was directed to the voice or data port of the telephone answering system for the duration of the transmittal. Thus, these systems had no ability to instantaneously monitor the incoming signal and to switch between voice and data processing as required for a particular incoming signal.

It would therefore be desirable to provide an integrated circuit board for receiving and transmitting voice signals and data over a single communications line, and which has the ability to discriminate and switch between voice and data processing modes as required to properly receive the incoming signal.

It would further be desirable to provide an integrated circuit board having single port voice and data capability in the form of a digital line card, so that the card could be readily interchanged to upgrade a conventional analog line card.

SUMMARY OF THE INVENTION

In view of the foregoing, it is an object of the present invention to provide a universal port comprising an integrated circuit board for receiving and transmitting voice signals and data over a single communications line, and which has the ability to discriminate and switch between voice and data processing modes as required to properly process the incoming signal.

It is another object of this invention to provide an integrated circuit board having single port voice and data capability in the form of a digital line card, so that the card could be readily interchanged for an analog line card to upgrade conventional electronic messaging systems.

These and other objects are accomplished in accordance with the principles of the present invention by providing an integrated circuit board for receiving and transmitting voice signals and data over a single communications line. This digital line card has the ability to monitor an incoming signal, to discriminate between voice, data and command signals, for example, DTMF signals. The digital line card changes processing modes as required in response to command signals received from the caller to properly process the incoming signal.

The apparatus of the present invention comprises an integrated circuit board or card intended to replace a conventional analog line card in a conventional electronic messaging system. The electronic messaging system interfaces with a telephone system and is capable of storing both voice messages and data transmittals, for example, facsimile transmittals, in electronic format. The digital line card comprises a central processing unit, a digital signal processing integrated circuit, a controller and dual-port random access memory.

The digital line card of the present invention is programmed using a conventional programming language (C-assembler programming language) so that the digital line card has the ability to discriminate between voice signals, data signals (modulated frequency or MF) and command signals, for example, DTMF. The digital line card includes programming that enables it to continuously monitor the incoming signal, to detect commands inserted within the data stream, and to switch between data and voice signal processing on a real-time basis responsive to those command signals.

The digital line card also fulfills the functions of a conventional analog line card by extracting desired information from the incoming signal, digitizing that information, and making the processed signal available for storage elsewhere in the electronic storage system. A digital line card constructed in accordance with the present invention is intended for insertion in a conventional voice processing system with no other required hardware changes.

BRIEF DESCRIPTION OF THE DRAWINGS

The above and other objects and advantages of the invention will be apparent upon consideration of the following detailed description, taken in conjunction with the accompanying drawings, in which like reference numerals refer to like parts throughout, and in which.

DESCRIPTION OF THE PREFERRED EMBODIMENTS

Figure 1:
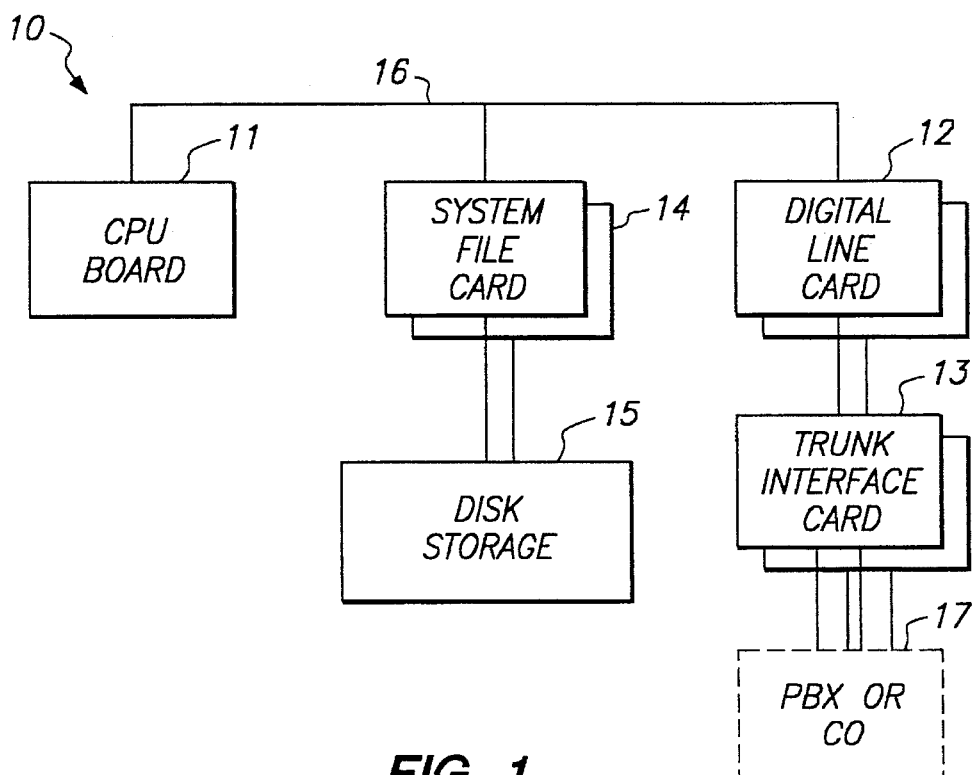
FIG. 1 is a block diagram of a voice messaging/data storage system with which the present invention is intended for use.

Referring to FIG. 1, a voice messaging/data storage system employing a digital line card constructed in accordance with the present invention is shown. Voice messaging/data storage system is connected to a central office telephone switch and is capable of intercepting calls when the call recipient is absent. The system comprises an electronic storage system capable of interfacing with a public switch telephone network or a private branch exchange/central office system, and includes an electronic storage medium capable of storing both voice messages and facsimile transmittable in electronic format.

When there is no answer for an incoming call, the system acquires control of the call and interacts with the caller, providing pre-programmed prompts as required to obtain information from, and provide information to, the caller. These prompts concern, for example, whether the caller desires to leave a voice message, a facsimile transmittal, or a composite voice/data message. The voice message or data sent by the caller is stored in electronic format for subsequent playback or print out, or both, by the call recipient.

As shown in FIG. 1, voice messaging/data storage system 10 comprises central processing unit (CPU) board 11, digital line card (DLC) 12, trunk interface card (TIC) 13, system file card 14 and data storage device 15. Components 11 through 15 are interconnected via communications bus 16. Central processing unit 11, which may be, for example, a 80386 microprocessor, available from Intel Corporation, Santa Clara, Calif., controls the data transfer over bus 16 between digital line card 12, and system file card 14.

Trunk interface card 13 couples digital line card 12 to the subscriber's telephone switch 17. Trunk interface cards 13 contain the compression and decompression and analog interface circuitry required for a particular interface. Incoming calls are passed via TIC card 13 to digital line card 12, which processes the incoming signal and makes it available on bus 16. TIC card 13 is connected only to its corresponding group of digital line cards, not to bus 16.

System file card 14 is coupled to data storage device 15, for example a conventional disk drive. Data storage device 15 stores the system files, subscriber profiles, voice greetings and preprogrammed prompts, and incoming voice messages, facsimile transmittals and composite voice/data messages received by the system in electronic format.

In accordance with the present invention, digital line card 12 includes a digital signal processing (DSP) semiconductor chip, for example, a TMS320C31, available from Texas Instruments, Houston, Tex., that functions as a single channel port for both voice and data communications. The DSP chip may be programmed using, for example, C-assembler programming language, so that the chip has the ability to discriminate between incoming voice signals and data transmissions, as well as the capability to detect command signals. This capability enables system 10 to switch between facsimile reception modes and interactive, voice activated modes upon receipt of the appropriate command signals.

Other than the digital line card described hereinafter, the components of the apparatus of FIG. 1 are commercially available, and may comprise, for example, the Aspen(TM) Voice Messaging System, sold by Octel Communications Corporation, Milpitas, Calif. Using conventional programming techniques, one skilled in the art may program the system in accordance with the process diagrams disclosed in copending and commonly assigned U.S. patent application Serial No. 08/033,618, filed Mar. 19, 1993, to provide, for example, a voice annotation capability for a facsimile transmittal, as described therein.

Figure 2:
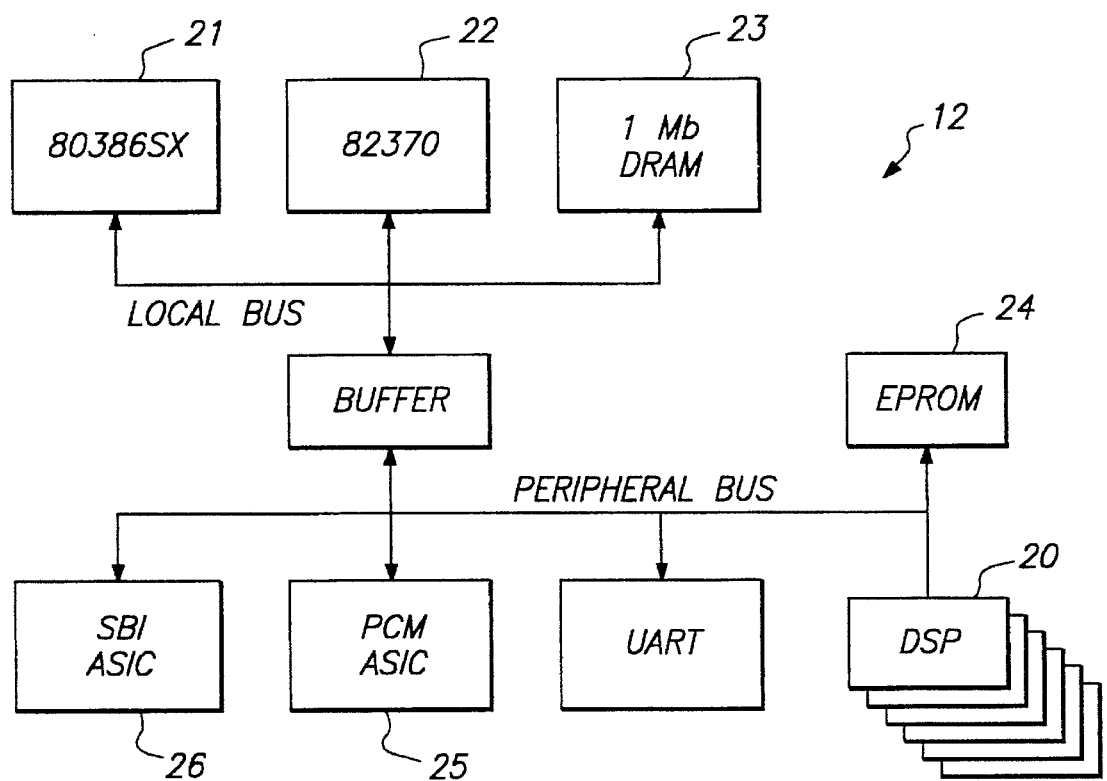
FIG. 2 is a block diagram of a digital line card constructed in accordance with the present invention.

Referring now to FIG. 2, digital line card ("DLC") 12 of the present invention is shown in block diagram form as comprising six digital signal processing cells (DSP cells) 20, an Intel 80386-SX central processor 21, an Intel 82370 integrated peripheral controller 22, dynamic random access memory ("DRAM") 23, boot memory 24 and additional control logic PCM ASIC 25 and SBI ASIC 26, described hereinafter. Each DLC supports 12 channels, two channels per DSP cell.

Each DLC 12 has a controller section comprising an Intel 80386-SX microprocessor and an 82370 integrated peripheral controller, both available from Intel Corporation, Santa Clara, Calif. The 80386-SX processor handles the signaling requirements on each of 12 interface channels. In addition to signaling, the 80386-SX performs many other functions relating to digital signal processing operations.

The Intel 80386-SX microprocessor is described at pages 4-601 to 5-698 of Intel Corporation's *Microprocessors, Volume II* databook (1992), which is incorporated herein by reference. As described at pages 4-1034 to 4-1159 of that databook, the 82370 provides a high performance direct memory access ("DMA") controller optimized for use with 80386 family microprocessors, including the 80386-SX microprocessor. The 82370 DMA controller can support up to 8 DMA channels for both 8-bit and 16-bit devices, In the preferred embodiment, only the SBI ASIC and PCM ASIC use the DMA channels. Both channels are treated as input/output devices, so that the DMA controller of the 82370 provides only the memory address and the read and write pulses.

A pulse code modulation bus, or "PCM highway" couples the DSP cells 20 to the Trunk Interface Cards 13. The TIC's serve as analog-to-digital and digital-to analog converters by converting incoming analog signals to pulse code modulation digital data and transmitted data from storage device 15 from digital data into analog signals.

The DLC card functions are divided into those that include processing of the PCM samples and call control functions. Included in the first category are tone detection, tone generation, voice compression and expansion, voice detection and playback controls. The second set of functions involve a higher level of control and are handled by the host processor on the card, the 80386-SX chip. These functions include call setup and cleardown, supervision of data transfers between DSP cells 20 and storage device 15, and interpretation of call progress tones and DTMF tones detected by the DSP cell.

Each DLC communicates with the main system processor (on CPU board 11) via serial bus 16 controlled by serial bus interface application-specific integrated circuit ("SBI ASIC") 26. The SBI ASIC, the details of which are incidental to the present invention, provides a voice bus for transfer of compressed voice samples between DLC 12 and system file card 14, and a command bus for transfer of control and status messages between DLC 12 and CPU board 11. Most transfers involve the movement of compressed voice samples between system file card 14 and a DSP cell on the DLC. Transfers between the serial bus interface and the 80386-SX are "fly-by" transfers, that is, they do not involve the holding of data in an intermediate location between read and write cycles. One skilled in the art will recognize that these functions can be implemented in ASIC logic using for example, conventional gate arrays.

The system clock to the 80386-SX is provided by a conventional programmable array logic ("PAL") based state machine. The timing of clock and RESET signals are synchronized to ensure reliable communications between the 80386-SX, 82370, and DRAM, described hereinafter. The state machine is conventional in design, except that a DRAM cycle is inhibited whenever a dual-port RAM location is being accessed.

In a preferred embodiment, DRAM provides 1 Mbyte of address space, for example, by using a conventional 1M×9 single in-line memory module ("SIMM") or two banks of four 256k×4 dual in-line pin ("DIP") DRAMS. Code for the 80386-SX is downloaded to this DRAM by CPU board 11 upon initialization of DLC 12. In addition, 32 k word electrically erasable programmable read-only memory ("EEPROM") 24 is provided on the DLC, and includes diagnostic and initialization functions for the 80386-SX that are executed each time it is restarted. In a preferred embodiment, the EEPROM may comprise a conventionally configured 27512.

Communications between the 80386-SX and each DSP cell are via dual-port random access memory ("dual-port RAM") 28. This memory, which is 2 k by 16 bits is partitioned to allow for separate voice and control messages in each direction. The dual-port RAM, depending upon the part selected, may provide a facility to allow a processor on either side (the 80386-SX or DSP cell) to interrupt the other processor. This can be achieved by having the processors write to a specific location, so that the interrupted processor clears the interrupt by reading the same location. A dual-port RAM suitable for use in the present invention includes the 7132/7142.

Figure 3:
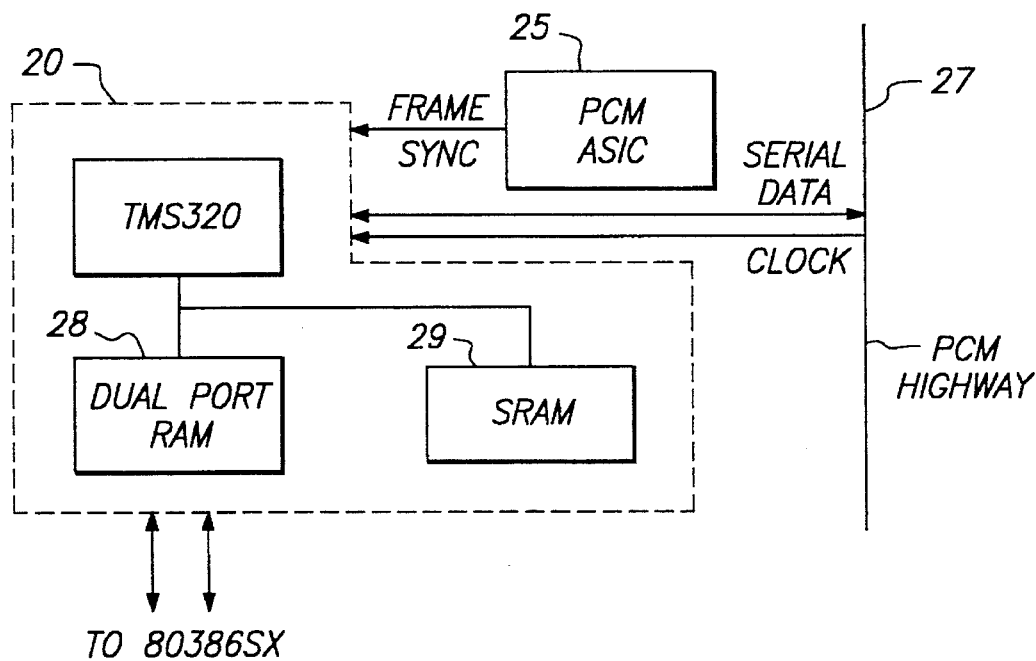
FIG. 3 is a block diagram of a digital signal processing cell shown in FIG. 2.

Referring still to FIG. 3, a block diagram of DSP cell 20 constructed in accordance with the present invention is described. The DSP cell comprises a Texas Instruments TMS320C31 DSP microprocessor, 16 k by 16 bit static random access memory ("SRAM") 29 and the above-mentioned 2 k by 16 bit dual-port RAM 28. Texas Instrument Corporation's TMS320 series digital signal processors are described, for example, in DIGITAL SIGNAL PROCESSING APPLICATIONS With The TMS320 Family, Volume 3, Prentice Hall (1990, Papamichalis editor). The TMS320 family of digital signal processors provides highly specialized processors for multiply and add functions, so that signal processing may take place on a real-time basis. The TMS320C31 selected for one embodiment of the present invention is driven by a 40 MHz clock and executes out of a system memory comprising 16 k words of SRAM. Unlike conventional implementations using this part, off-chip program memory, off-chip data memory and I/O memory do not exist in separate memory spaces. Instead, a flexible boundary is maintained between program space and data space.

The DSP cell is responsible for providing tone detection and generation, as well as voice compression and expansion for two channels of a TIC card, as described hereinbefore. The data received by the DSP cells from the TICs consists of voice, DTMF digits, call progression tones, test tones or combinations of these tones. All out of band information (e.g., ringing, off-hook, on-hook conditions) is passed directly to the 80386-SX on the DLC. All information processed by the TMS320C31 chips is passed to the 80386-SX which either uses this information locally or passes it to CPU board 11 via bus 16.

In one embodiment of the present invention, voice compression and expansion is accomplished by the DSP cell using a variable bitrate subband coder ("VBSBC") voice compression algorithm, which produces 16 kbit/sec of data for storage and retrieval. Of course, as will be recognized by those skilled in the art of compression techniques, other compression algorithms may be employed.

The TMS320C31 communicates with the 80386-SX controller via dual-port RAM 28. RAM 28 has separate blocks assigned for both incoming and transmitted voice samples, and for control and status messages to be passed between the controller and the DSP cell. Voice samples are transferred between the DSP Cell and the TIC via the serial port of the TMS320C31. These voice samples are encoded in companded format.

Clock control and framing pulses are provided for transfers of companded voice samples between PCM highway 27 and DSP cell 20 by PCM ASIC chip 25, which provides the interface between the DSP Cell and the PCM highway. These transfers consist of signaling information for all 12 channels on a TIC. The PCM ASIC provides the clock and the frame sync pulses to begin transmission and reception of each sample. In addition, the PCM ASIC can be programmed to discard a variable number of multiframes, for example, 1:544 msec, of signaling data, to reduce the burden on the 80386-SX and to provide a variable scan rate of the line status of the channels. The PCM ASIC, the details of which are incidental to the present invention, could be implemented in ASIC logic by one skilled in the art by using, for example, conventional gate arrays and programmable logic arrays.

Upon restart of the DLC, the reset line to the TMS320C31 is latched, holding the processor in reset. The 80386-SX may reset each DSP cell separately by providing six separate I/O addresses to reset and release each DSP cell. The 80386-SX ensures that the contents of the dual-port RAM are valid and then releases the processor from the reset state. Upon completion of download of code from the 80386-SX to the dual-port RAM, the TMS320C31 begins executing out of the dual-port RAM, since a RESET signal sets the program counter to 0. As soon as normal operation begins, the dual-port RAMs are used mainly as data memory by the TMS320C31.

Functions Of The Digital Line Card

The DLC of the present invention is designed to replace and improve certain functionality of conventional analog line cards. In particular, the DLC will provide the system with the ability to discriminate between voice and data, to detect command signals included in the signal stream and to switch between required modes of processing in response to those command signals. The DLC also provides a capability to process incoming voice information with any of several types of voice compression algorithms. To achieve these functions, the TMS320C31 chip must be programmed to support the activities, described hereinafter, during off-hook operation. In the on-hook state, the TMS320C31 will be in an idle mode, primarily running diagnostics and waiting for commands from the 80386-SX processor.

1. Monitoring Call Progress

Where the system detects that a telephone receiver has gone off-hook, the DLC analyzes incoming signals and decodes various events before moving to playback or record mode. Voice detection is used to recognize that an outgoing call from the system has been initiated. An example of voice detection is provided in copending and commonly assigned U.S. patent application Ser. No. 07/625,369, filed Dec. 11, 1990, and entitled Methods and Apparatus For Detecting Voice Information In Telephone Type Signals. To achieve these functions, the DSP cell is programmed to receive and expand a 64 kbps data stream generated by the TIC from logarithm data to linear format and to output a 16 kbps data stream for storage.

The DLC is programmed to monitor for call progression tones and multifrequency (MF) digits by reporting envelope data to the 80386-SX processor. The MF digits are used for system communication in a manner analogous to the use of DTMF digits by the caller. The specific envelope filters are preset by a command from the 80386-SX; the 80386-SX then post-processes the envelope information to extract out call progression tones and MF digits. This envelope data also contains a time stamp and the results of a voice detection test.

The DLC also is programmed with the capability to decode DTMF digits and to report these command digits to the 80386-SX processor. One such scheme is described in copending and commonly assigned U.S. patent application Ser. No. 07/625,366, filed Dec. 11, 1990. The 80386-SX processor in turn instructs the DSP cell to retrieve the appropriate programming from the 16 K SRAM memory to process the incoming data stream. The 80386-SX receives time information to track when the DTMF digit was received relative to the beginning of call progress monitoring. The DSP cell transfers high band and low band energy level information for the DTMF digit to the 80386-SX processor.

An example of the operation of the DLC is provided in copending and commonly assigned U.S. patent application Ser. 08/033,618, filed Mar. 19, 1993. Depending upon the DTMF digits received from the caller in response to the system prompt whether the caller desires to leave a voice message (or send a facsimile transmittal), the 80386-SX instructs the DSP cell for that channel to load coding for either voice or data processing. For example, with respect to the voice annotation scheme described in the above-identified application, if the caller presses the "4" key in response to system prompt:

"To record a voice message, please wait for the tone. When you have finished recording, you may hang up or press 1 for more options. To send a fax message or record a voice annotation for a fax message, press 4 now"

and the "1" key in response to the prompt:

"Here are your options: To send a fax without a voice annotation, press 1. To record a voice annotation for a fax message, press 2. To send a fax with an assigned Fax ID, press 3. To exit, press *.

then the DSP cell will load coding to emulate a conventional facsimile machine. In particular, the DSP cell will first load coding to emulate a control modem, that is V.29 or V.21 standard protocol (300 bps for handshake and modem), and then load programming for a T.30 standard data modem. When the data transmission is complete, the DSP cell will monitor the line for a disconnect or further DTMF digits.

2. Message Recording

To record messages, the DLC monitors for DTMF digits and disconnects, and provides periodic reporting of compressed speech, for example, every 64 msec. The DSP cell monitors for incoming DTMF digits and reports to the 80386-SX concerning, for example, time information relative to the start of recording and high band/low band energy measurements for the digit.

When the system moves to a message recording mode, either as a default or in response to the input of an appropriate DTMF digit by a caller, the 80386-SX processor instructs the DSP cell for that channel to load programming for voice processing. Accordingly, the DSP cell is programmed to convert incoming logarithm based samples generated by the TIC to linear format. The DSP cell computes a peak level of input frames and returns compressed voice data to the 80386-SX processor. These peak levels enable the processor to determine the silence threshold setting during recording.

The DSP cell implements an automatic gain control mechanism to stabilize the amplitude of the incoming signal before encoding, and filters and compresses the incoming 64 kbps bit stream using an algorithm, for example, Variable Bitrate Subband Coding. In processing this data, the DSP cell transmits a compressed speech packet to CPU board 11 every 64 msec.

3. Playback Of Recorded Messages

During playback of recorded messages, the DSP cell monitors incoming DTMF digits and disconnects. For message recording, the DSP cell monitors for incoming DTMF digits and reports to the 80386-SX concerning, for example, time information relative to the start of playback and some high band/low band level measurements. Tight coupling is established between the receipt of an incoming DTMF digit and the particular uncompressed speech played back at that time, so that any echo off of the hybrids on the path of the outgoing message do not corrupt an incoming DTMF digit. This tight coupling enables DTMF digits to be used for commanding such features, as, for example, message editing and pause during playback.

To accomplish these tasks, the DSP cell is programmed to decode and reconstruct 16 kbps encoded records to linear format, to adjust for speed control and output level control according to adjustment information received from the 80386-SX processor. The DSP then encodes the linear formatted data into 64 kbps, logarithm-based data and transmits that data to the TICs.

The DSP cell is provided with filters that are preset by the 80386-SX processor to monitor for disconnects by reporting envelope data to the 80386-SX. An echo-cancellation algorithm, for example, that described in commonly assigned U.S. Pat. No. 5,164,989, is provided for protection against corruption of incoming DTMF signals caused by reflection of outgoing messages off the local hybrid.

4. Tone Generation

The DSP cell is able to generate certain tones that are provided to the TIC. For outgoing calls, DTMF and MF digits are needed. To notify a listening caller during an interactive mode, different beep tones are generated by the DSP cell, rather than retrieving those tones by downloading data for these tones to bus 16 from storage device 15. Also, during recording of messages, certain tones are provided to signal the end of message space.

To accomplish these functions, the DSP cell is programmed to generate tones of predetermined duration consisting of one or two frequencies with separately adjustable levels, for example, beeps, DTMF digits, MF digits, call progression tones and test tones. Programming is provided for the DSP cell to compute the energy of the incoming signal to provide a diagnostic tool for use with analog TICs. In addition, the DSP cell is programmed to compress and expand data between logarithmic and linear formats.

Digital Line Card Stated Diagram

1. Idle state Transitions

Figure 4:
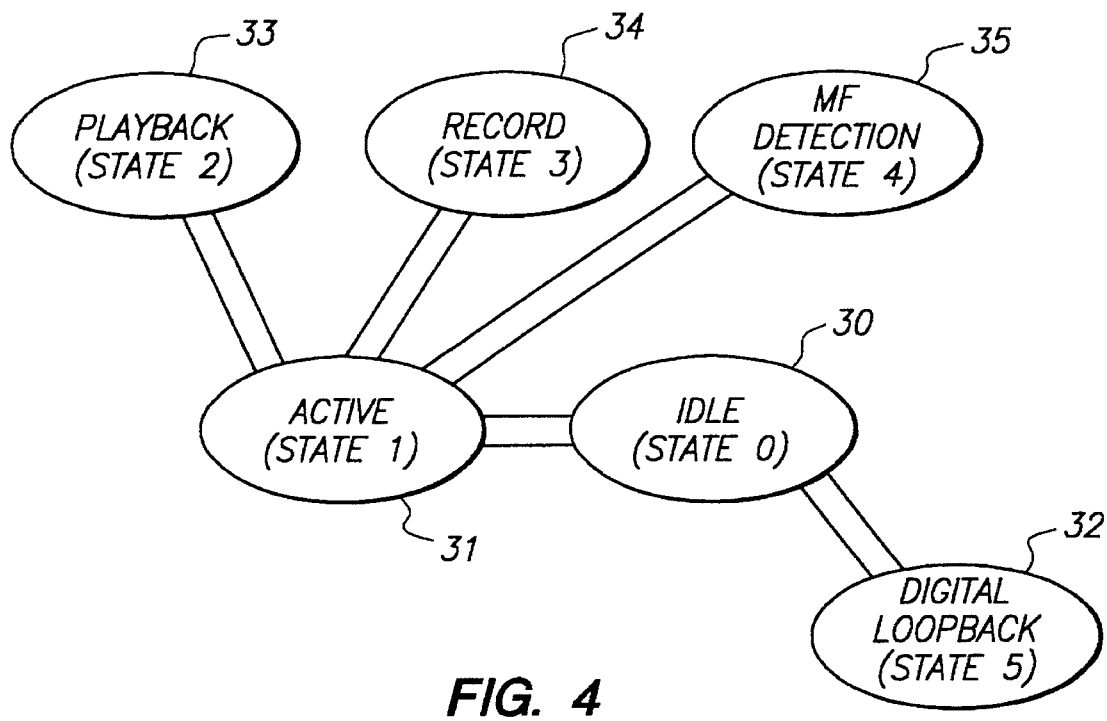
FIG. 4 is a state diagram showing the operational states of a digital line card constructed in accordance with the present invention.

Referring to FIG. 4, a state diagram illustrating the operational states of a channel of the DLC of the present invention is described. Commands that instruct the DSP cell to move through states 30–35 shown in FIG. 4 are provided to the DSP cell via dual-port RAM 28, and can be either local (state specific) or non-local (non-state specific). Certain commands are allowed only when the channel is in a certain state. Receipt of these commands in other than a specified state will result in an error event signal being sent from the DSP cell to the 80386-SX.

Initialization for voice or data processing begins from Idle state 30 (State 0), during which the DSP cell awaits commands from the 80386-SX processor. During the idle state the DSP cell can receive commands to move to Active state 31 (State 1) or a testing state 32 (Digital Loopback, State 5). During Active State 31, the DSP cell runs the envelope filters currently initialized by the 80386-SX, and the DTMF detector. The DSP cell outputs silence unless generation of a tone is specified.

The transition from Idle 30 to Active 31 results in initialization of the time stamps, which are used by the 80386-SX as a real time marker for certain events, for example, the DTMF digit received event, described hereinafter. During this transition the histogram locations in the dual port RAM assigned to the channel transmit and receive buffers are initialized to zero.

To facilitate testing of digital trunk interface cards, such as T1, the 80386-SX may command the DSP cell to move to Digital Loopback state 32 (State 5). Once in State 5, the DSP cell begins to loopback data received from the serial port for that channel with a 64 msec delay.

Upon the completion of a call, for example, upon detection of a disconnect, the 80386-SX processor issues an "End Active" command to the DSP cell that causes a change from Active state 32 back to Idle state 30. All processing with respect to envelope filtering, tone generation, and DTMF detection will stop for that channel. The DSP cell assumes an Idle state upon receipt of this command and remains in the idle state until it receives a command from the 80386-SX to begin a new process.

2. Active State Transitions

Once the DSP cell has moved to Active state 31, the 80386-SX may instruct the DSP cell to transition to any of states 33 through 35. Upon transition from Idle state 30 to Active state 31, the 80386-SX issues commands to the DSP cell to define the Envelope Filters/Voice Detection (EFVD) setup, and signals the DSP cell to start filtering.

The envelope filters and DTMF detection algorithms are run during Active state 31, so that the 80386-SX can receive instructions from the caller to determine the operational mode for the DSP cell. The 80386-SX processor instructs the DSP cell to start processing the incoming signal through the DTMF detector upon initialization, and after receipt of a "Stop DTMF Detector" command.

The "Stop DTMF detector" command is issued by the 80386-SX to disable the DTMF detector when the DSP cell is generating outgoing DTMF digits to guard against false detection of digits due to echo from hybrids. The DSP cell is programmed to include an echo-cancellation algorithm, but this algorithm is run only in Playback state 33. Thus, to prevent false detection of DTMF digits, the 80386-SX must first send a "Stop DTMF detector" command, followed by one or more "Generate Tone"/"Generate Silence" pairs to outpulse DTMF signals, send a "Wait" command to allow the generated tones to be transmitted from the serial port, and then send a "Start DTMF detector" command to reenable the DTMF detector. If a state change to Playback state 33 or Record state 34 occurs while the DTMF detector is off in Active state 31, the DTMF detector is automatically enabled.

3. Playback State

For each transition from Active state 31 to Playback state 33, several parameters must be initialized before speech playback can begin. Where speech has been recorded using any of several algorithms, the playback command must include a variable defining the speech compression algorithm applied. In addition, the command includes variables that adjust playback speed and volume once initialization is complete, the DSP cell sends a "Play Data Request" event to the 80386-SX to request transfer of compressed speech or silence data to playback. As shown in FIG. 4, Playback state 33 may be entered only from Active state 31.

Once playback has commenced, the 80386-SX sends a packet of compressed speech to the DSP cell in response to the "Play Data Request" event. This protocol is carried out in a repetitive fashion until the 80386-SX decides to end Playback state 33. Every time the DSP cell receives a speech packet to play, it sends a request for a new packet through a high throughput area of dual-port RAM before it starts decoding the received packet. If the 80386-SX lags behind the DSP cell and for some reason cannot supply the compressed speech packets in real time, the DSP cell will revert to playing silence.

During Playback state 33, the 80386-SX processor has local control over the playback speed according to user prompts (via DTMF digits). Speech and silence intervals are separately specified. In addition to the compression algorithm indicator, the playback speed adjustment command includes variables that are used to determine the frequency of replication or deletion of 4 msec speech intervals, the number of 4 msec speech intervals that are to be inserted or deleted, and a multiplication factor used to adjust the duration of the silence played back.

Likewise, the 80386-SX has local control over the output volume during playback according to user prompts (again via DTMF digits). These command variables include a multiplication factor that scales the output speech sample prior to logarithm encoding. Volume adjustments are made only to speech samples during playback; tone generation is not affected by this variable.

Upon completion of playback of a message (either at the end of the message or upon receipt of a user command) the 80386-SX processor instructs the DSP cell to revert from Playback state 33 to Active state 31. The DSP cell may be instructed either to play back silence or to continue sending whatever it was told to play last while moving to the Active state. This feature allows the 80386-SX to command the DSP cell to change states while finishing playback of a message in anticipation of the next command being a move to Record state 34, where the transmit buffer is filled with silence. In addition, the 80386-SX may command the DSP cell to generate a "Synchronize Time Stamp" event when the end of transmission point in the ring buffer is determined. Using this information, the 80386-SX can determine where in the playback message transmission stopped at the serial port out to the network.

Alternatively, the 80386-SX may instruct the DSP cell to fill the transmit buffer with silence immediately and further commands continue to be decoded as they are received. In this case, a "Synchronize Time Stamp" event is not sent to the 80386-SX processor.

4. Record State

For transition from Active state 31 to Record state 34, several parameters are again initialized before speech recording can begin. Where speech may be recorded using any of several algorithms, the record command must include a variable defining the speech compression algorithm to be applied. Once initialization is complete, the DSP cell returns a "Sync Time Stamp" event to the 80386-SX to mark the time of the start of the recording. AS shown in FIG. 4, Record state 34 may be entered only from Active state 31.

When message recording is complete, as indicated by, for example, a user response (via DTMF digit) or a disconnect, the 80386-SX issues a command causing the DSP cell to revert from Record State 34 to Active state 31. Upon returning to the Active state, the DSP cell will resume running the currently initialized envelope filters, the DTMF detector, and will output silence unless generation of a tone is specified. Partially compressed speech data will be discarded.

5. MF Detection

The 80386-SX may also issue a command causing the DSP cell to change from Active state 31 to MF Detection state 35. In state 35, the tasks allowed to run on the receive side are receive framing task and enveloped filtering task. Transmit framing task runs on the transmit side. When MF detection is complete, 80386-SX processor issues a command that causes the DSP cell to revert to Active state 31.

The DSP cell of the present invention has been programmed to generate a "Synchronize Time Stamp" event that allows the 80386-SX processor a measure of "real time" with respect to signals received or transmitted at the output of the serial port of the DSP cell. In particular, this measure of time is used to synchronize a DTMF digit event to either a 4 msec interval in a playback frame or a 4 msec interval in a recorded message. During playback the 80386-SX needs to known where in the playback message the DTMF digit was received with better accuracy than a particular 64 msec frame. Also, during recording of a message, the 80386-SX must be informed where a DTMF digit came in relative to a compressed record sequence if it is desired to provide the user the ability to edit recorded messages.

When the DSP cell is instructed to go from Idle state 30 to Active state 31, the time stamp is initialized to zero. Time stamp counters continue to run as the DSP cell is instructed to change between Active, MF Detect, Playback and back to Idle. Only during the transition from Idle to Active states are the counters initialized to zero. When a first playback speech frame command is decoded, the DSP cell sends a time stamp event to the 80386-SX so that the 80386-SX knows when the DSP cell has begun to playback a message to the user. DTMF digits that are reported after this time can be synchronized to the 4 msec interval in the playback message when the DTMF digit was received. Similarly, when starting in record mode, the DSP cell will send a time stamp event to mark the start of compressed incoming signal. Using the time stamp returned with a DTMF digit received, the 80386-SX can then determine where in the string of compressed speech the digit arrived.

One skilled in the art will appreciate that the present invention can be practiced by other than the described embodiments, and that the present invention is limited only by the claims that follow.

What is claimed is:

1. A digital line card providing a universal port for a messaging system to receive and store voice messages and data transmittals, the data transmittals comprising text or image or both, the digital line card enabling the messaging system to receive and record voice messages and data transmittals over a single port, the digital line card comprising:

a. signal processor means for processing an incoming data stream from said single port according to a plurality of signal processing algorithms to generate a processed data stream, the plurality of algorithms including algorithms for discriminating between and processing voice signals, data signals including modulated frequency (MF) and command signals in the incoming data stream, wherein the plurality of algorithms provide for the detection of command signals concurrently with the processing of the voice and data signals b. storage means for storing program code implementing the plurality of signal processing algorithms;

c. controller means for instructing the signal processor means to execute program code implementing a selected one of the plurality of algorithms, so that the controller means repeatedly switches the signal processor means between executing program code implementing a first one of the plurality of algorithms and executing program code implementing a second one of the plurality of algorithms responsive to the command signals.

2. The digital line card as defined in claim 1 wherein the signal processor means comprises a digital signal processing integrated circuit, the storage means comprises a random access memory component and the controller means comprises a microprocessor.

3. The digital line card as defined in claim 2 wherein the first one of the plurality of algorithms comprises a speech compression algorithm.

4. The digital line card as defined in claim 2 wherein the second one of the plurality of algorithms comprises a modem protocol.

5. The digital line card as defined in claim 2 wherein the command signals comprise dual-tone multifrequency (DTMF) signals.

6. The digital line card as defined in claim 1 wherein the plurality of algorithms further includes an algorithm for detecting the presence of speech, the algorithm for detecting speech stored in the storage means as program code.

7. The digital line card as defined in claim 1 wherein the plurality of algorithms further includes an algorithm for generating DTMF signals, the algorithm for generating DTMF signals stored in the storage means as program code.

8. The digital line card as defined in claim 1 wherein the plurality of algorithms further includes an algorithm for generating silence, the algorithm for generating silence stored in the storage means as program code.

9. The digital line card as defined in claim 1 wherein the digital line card is adapted to replace an analog line card used in an electronic messaging system.

10. The digital line card as defined in claim 1 wherein the signal processor means and the controller means communicate with each other by control signals, the signal processor means moving amongst a series of operational states responsive to both the command signals and the control signals.

11. The digital line card as defined in claim 1 wherein the plurality of algorithms further includes algorithms for the decompression and playback of voice messages recorded on the messaging system.

12. A digital line card for a messaging system that receives and stores voice messages and data transmittals, the data transmittals comprising text or image or both, the digital line card enabling the messaging system to receive and record voice messages and data transmittals over a single communications port, the digital line card comprising:

a. a digital signal processing integrated circuit for processing an incoming data stream from said single communications port, the digital signal processing integrated circuit using a first algorithm when the incoming data stream comprises speech, a second algorithm when the incoming data stream comprises text or image data, and a third algorithm for detecting the presence of command signals in the incoming data stream, wherein the third algorithm operates with either of the first and second algorithms;

b. a random access memory integrated circuit for storing program code implementing the first, second and third algorithms;

c. a microprocessor for instructing the digital signal processing integrated circuit to execute program code implementing the third algorithm to detect the presence of command signals in the incoming data stream and to execute program code implementing either the first algorithm or the second algorithm responsive to the command signals, so that the digital signal processing integrated circuit repeatedly switches between performing the first algorithm and performing the second algorithm responsive to the command signals.

13. The digital line card as defined in claim 12 wherein the first algorithm comprises a speech compression algorithm.

14. The digital line card as defined in claim 12 wherein the second algorithm comprises a modem protocol.

15. The digital line card as defined in claim 12 wherein the command signals comprise dual-tone multifrequency (DTMF) signals.

16. The digital line card as defined in claim 12 wherein the digital signal processing integrated circuit is further adapted to use an algorithm for detecting the presence of speech, the algorithm for detecting speech being stored as program code in the random access memory integrated circuit.

17. The digital line card as defined in claim 15 wherein the digital signal processing integrated circuit is further adapted to use an algorithm for generating DTMF signals, the algorithm for generating DTMF signals stored as program code in the random access memory integrated circuit.

18. The digital line card as defined in claim 12 wherein the digital signal processing integrated circuit is further adapted to use an algorithm for generating silence, the algorithm for generating silence stored as program code in the random access memory integrated circuit.

19. The digital line card as defined in claim 12 wherein the digital line card is adapted to replace an analog line card used in an electronic messaging system.

20. The digital line card as defined in claim 12 wherein the digital signal processing integrated circuit and microprocessor communicate with each other by control signals, the digital signal processing integrated circuit moving amongst a series of operational states responsive to both the command signals and the control signals.

\* \* \* \* \*